United States Patent [19]

Sienkiewicz

[11] Patent Number: 4,559,736
[45] Date of Patent: Dec. 24, 1985

[54] FISHING FLY

[76] Inventor: Joseph A. Sienkiewicz, Main St., Beaver Falls, N.Y. 13305

[21] Appl. No.: 517,959

[22] Filed: Jul. 28, 1983

[51] Int. Cl.$^4$ ............................................. A01K 85/08
[52] U.S. Cl. .................... 43/42.25; 43/42.53
[58] Field of Search ................ 43/42.25, 42.53, 42.26, 43/44.98

[56] References Cited

U.S. PATENT DOCUMENTS

| | | | |
|---|---|---|---|
| 1,953,692 | 4/1934 | Shoff | 43/42.53 |
| 2,082,305 | 6/1937 | Strong | 43/42.25 |
| 2,757,476 | 8/1956 | Pender | 43/42.53 |
| 2,814,148 | 11/1957 | Allen | 43/42.32 |
| 3,063,189 | 12/1962 | Keller | 43/44.98 |
| 3,449,853 | 6/1969 | Shearer | 43/42.24 |
| 3,505,755 | 4/1970 | Pearce | 43/42.24 |
| 3,690,029 | 9/1972 | Pobst | 43/42.25 |
| 3,748,168 | 7/1973 | Schmidt | 43/44.98 |
| 3,808,725 | 5/1974 | Matsumoto et al. | 43/44.98 |
| 3,888,037 | 6/1975 | Warthen | 43/44.98 |
| 4,186,510 | 2/1980 | Kimerer, Jr. | 43/42.25 |
| 4,253,263 | 3/1981 | Franklin et al. | 43/42.26 |
| 4,411,089 | 10/1983 | Runeric | 43/42.53 |

FOREIGN PATENT DOCUMENTS 1242666  8/1971  United Kingdom ............... 43/42.25

OTHER PUBLICATIONS

"Flat Monofilament" advertisement *Thomas & Thomas* Catalog, p. 80, 1983.
"Latex Body Material" advertisement, *Thomas & Thomas* Catalog, p. 81, 1983.
"Swannundaze Nymph Material" advertisement, *Thomas & Thomas* Catalog, p. 81, 1983.
"Floating Fly Hook" advertisement, *Outdoor Life*, p. 14, Jul. 1981.
"In Idaho, The Hatch of the Green Drake", *Time*, p. 7, Aug. 15, 1983.
"Sponge Rubber Fly Bodies" advertisement, *Thomas & Thomas* Catalog, p. 78, 1983.

*Primary Examiner*—Nicholas P. Godici
*Assistant Examiner*—M. Jordan
*Attorney, Agent, or Firm*—Schwartz, Jeffery, Schwaab, Mack, Blumenthal & Evans

[57] ABSTRACT

An artificial fly having hollow plastic tubing wrapped transversely around the shank portion of a fish hook. The wrapping produces a segmental appearance, and color is imparted to the tubing to simulate the body color of the insect which the fly is intended to represent.

13 Claims, 4 Drawing Figures

FISHING FLY

FIELD AND BACKGROUND OF THE INVENTION

The present invention relates as indicated to a fishing fly, and relates more particularly to a fly having distinctly improved properties of floatability, simulation of insects, ease of assembly, and wide versatility.

The invention is principally directed to the creation of a dry fly which those in the art will understand to mean a fly specifically designed to float on the surface of the water. Desirably, the dry fly should have the requisite characteristics for its intended purpose, namely, it should float on the water surface, simulate as closely as possible the insect which it is intended to represent, and be relatively inexpensive to assembly or manufacture. A further, highly desirable characteristic, is the adaptability of the basic fly construction to size, configuration and other characteristics so as to permit the concept to be utilized for a wide variety of insects.

Due to the ingeniousness of fisherman, it is not surprising that there is a great variety of artificial fishing lures in the prior art. In U.S. Pat. No. 2,814,148 to M. Allen, for example, two threads of contrasting color are wrapped around the shank of the fishing hook, with the colors being selected to correspond to the colors of the back and breast of the real insect. Although insect simulation is achieved, the application of the colored threads to the shank of the hook is a very laborious process.

In U.S. Pat. No. 3,449,853 to W. Shearer, a very flexible and limp yarn is encased within and bonded to a plastic body made of very soft plastic so as to present a soft feel or taste to the striking fish. The body portion is generally tubular and can be adhered to the inner yarn in any suitable manner.

U.S. Pat. No. 3,505,755 to J. C. Pearce also discloses an artificial lure which resembles a small fish or eel and comprises an elongated plastic body provided with a cavity in which is sealed an elongated, flexible member which can be manufactured from yarn or thread. The material is saturated with a fish-enticing compound, and when the hook is inserted through the lure, the internal cavity is penetrated thereby releasing the fish-enticing compound.

There is disclosed in U.S. Pat. No. 4,253,263 to R. L. Franklin et al. a fishing lure in which a wire is positioned within a length of surgical tubing. The tubing may be formed with contrasting colors on its outer and inner surface, with the entire assembly being intended to simulate an eel.

U.S. Pat. No. 3,690,029 to J. R. Pobst discloses a fishing fly in which flexible hairs or strands are tightly and densely wrapped by thread to form a body portion around the shank of the hook, with the body portion being configured relative to the rest of the lure that the weight of the lure causes the body to slightly indent the water surface.

In U.S. Pat. No. 4,186,510 to N. B. Kimerer, Jr., there is disclosed a simulated nymph in which a center section comprised of spaced shank wires have wrapped therearound fly threads to produce a horizontal flat-bodied appearance, simulating the live nymph. The layers of wrapped thread are sufficient in number to achieve the intended simulation.

To summarize the prior art, it is well known to wrap fly thread around the shank of the hook or other wire construction to provide a simulated insect body. It is also known to insert a flexible wire through a tubular plastic material extending longitudinally around the wire, for the purpose of drawing the lure through the water in an irregular pattern. In all uses of plastic tubing known to applicant, such tubing extends longitudinally of the lure.

SUMMARY OF THE PRESENT INVENTION

It is the principal object of the present invention to provide a dry or floating fly or lure by the use of plastic tubing which is wrapped around the shank of the hook so as to be disposed generally transversely to the axis of the hook. The use of plastic tubing, which can comprise commercially available surgical tubing, provides a number of important advantages. First, the plastic tubing can be sealed prior to wrapping, as a result of which the entrapped air within the hollow tubing substantially increases the floatability of the fly. Secondly, the transverse wrapping of the tubing closely simulates or resembles insects having relatively segmented body portions, for example, mayflies, stoneflies, caddis and midges. Further, by using different tubing diameters and cross sections, the basic technique in accordance with the present invention can be satisfactorily employed on a wide range of hook sizes, thereby greatly expanding the number of insects which can be simulated.

A further feature of the invention resides in such hollow tubing being optionally colored to closely resemble the body color of the simulated insect. As an alternative method of color simulation, a clear or translucent tubing can be employed, and colored floss, chenille, thread or the like inserted and sealed within the tubing prior to wrapping the same around the shank of the hook.

Another important advantage of the present invention is that the lure can be manufactured and assembled using standard and well known techniques. In fact, as will be hereinafter described, the novel fly constructed in accordance with the present invention can be assembled by merely using the described tubing, commercially available fly tieing thread, and a hackle pliers.

The improved floating characteristics of the present invention particularly adapts the lure to relatively fast moving water in which there is a tendency for present artificial lures to sink. The basic concept by which the floatability is substantially increased can also be used to advantage to create better floating imitations of other simulated insect fly patterns such as ants, dragonflys, crickets, grasshoppers, caterpillars, inch worms and other terrestial insects. The concept can also be used to modify current standard artificial lures normally used for other game fish such as bass or blue gills.

While floatability is a desired and essentially necessary characteristic for dry flies, the artificial fly of the present invention can be modified or added to provide a sinking characteristic. For example, a lead sinker or core could be used with the assembly for dragging the assembly under water, thereby simulating the underwater variety of natural insect life such as nymphs, hellgrammites, and other forms of underwater insects in their earlier stages of evolution.

These and other objects of the invention will be apparent as the following description proceeds and particular reference to the application drawing is made.

BRIEF DESCRIPTION OF THE APPLICATION DRAWING

FIG. 1 is a fishing fly constructed in accordance with the present invention;

FIG. 2 comprises a greatly enlarged cross sectional view through the tubing, which is shown sealed at both ends and enclosing a material the color of which is adapted to impart to the fly the intended color simulation;

FIG. 3 is a fragmentary side elevational view of the end of a fishing hook, showing the preliminary stages of securing the plastic tubing to the shank of the hook, and FIG. 4 is a side elevational view of the hook with the tubing being wrapped around the shank of the hook and secured at its ends to the hook.

DETAILED DESCRIPTION OF THE PREFERRED EMBODIMENTS

Figure 1:
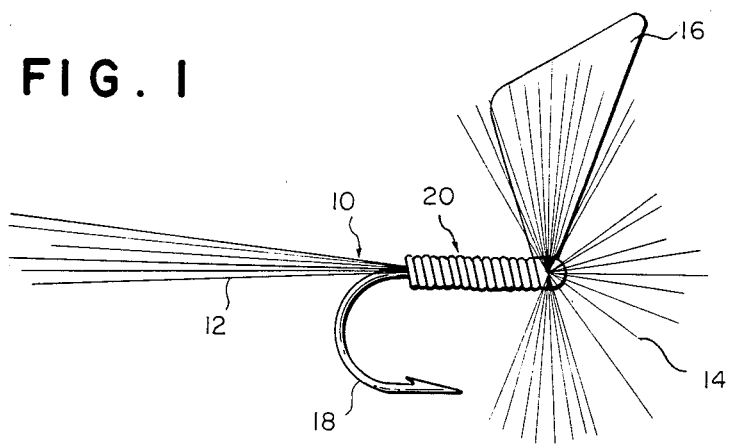

Referring now to the application drawing wherein like parts have been indicated by like reference numerals, and initially to FIG. 1, there is illustrated therein the artificial fly, generally indicated at 10, constructed in accordance with the present invention. As customary, the fly includes a tail 12, hackle 14, and an artificial wing diagrammatically shown at 16, all of which are secured to the shank of the fishing hook 18 in a conventional manner. Since neither the tail, hackle or wings, nor the method of mounting the same, comprise part of the present invention, these elements have been shown essentially in diagrammatic form, and it will be understood that these features can and will be modified depending upon the insect being simulated. Likewise, the hook 18 per se forms no part of the present invention.

Tubing generally indicated at 20 is wrapped around the body of the hook and generally forms the body of the simulated insect. The tubing is tightly wrapped and inherently provides a segmented appearance common to mayflies and other insects on which a great number of fish surface feed.

The tubing 20 can be of any commercially available type, for example, relatively small diameter surgical tubing has been found entirely satisfactory. There are numerous suppliers of such tubing, which can be of polyethylene or other suitable material having a specific gravity less than water. Very satisfactory results have been obtained through the use of polyethylene tubing manufactured by Markson Science Inc. The specific gravity of such tubing ranges from 0.91–0.96 depending on the density of the polyethylene. The inside and outside diameters of the tubing vary over a wide range, with tubing having an inside diameter of 0.023" and an outside diameter of 0.038" being very satisfactory in testing to date. Tubing having a smaller interior diameter could be employed although it becomes increasingly more difficult to insert the floss or the like in the tubing. Larger diameter tubing can obviously be employed; in fact an inportant advantage of the invention is the versatility of the basic concept, that is, the ability to use tubing of various sizes and colors to expand the insect simulation capabilities of the fly.

Figure 2:
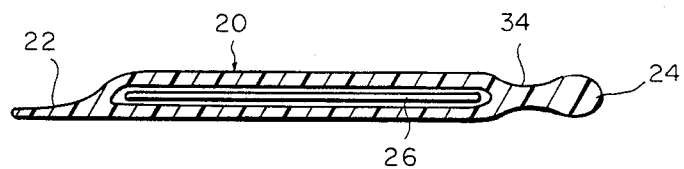

The increased floatability of the fly depends upon the tubing being sealed at its ends to totally enclose the interior of the tubing. FIG. 2 shows one method by which this can be accomplished. A desired length of tubing is cut off, and the ends are sealed by heat sealing, welding or the like. One end 22 has substantial length to permit such end to be secured to the shank of the hook, as will be hereinafter described, and the other end 24 of the tubing is preferably shaped in the form of a tab to facilitate wrapping of the tubing around the hook shank. In FIG. 2, a material 26 such as colored floss, chenille, or the like, is shown encased within the thus formed cavity in the body, and in the event the plastic is clear or translucent, the color of the floss or other material is transmitted through the tubular body. In this manner, the color can be selected as desired depending upon the intended simulation. It will be understood that the floss or other material is positioned in the tubing prior to the heat sealing or welding of the ends to the construction shown in FIG. 2. The color simulation can also be achieved by the color of the tubing itself. Also, a layer or layers of colored thread can be wrapped around the shank of the hook, and such color transmitted through a clear or transparent sealed tubing to achieve the desired color simulation.

Figure 3:
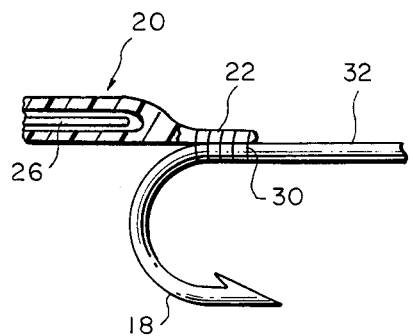

FIG. 3 illustrates the manner in which the plastic tubing is initially secured to the shank of the hook. The end 22 is simply placed contiguous the end of the shank, and thread 30 is tightly wrapped around the end 22 to firmly secure the same to the hook.

When the end 22 of the tubing has been secured, the tubing is then wrapped transversely around the shank 32 of the hook, preferably in a tightly wound manner. The provision of the relatively enlarged tab 24 permits a hackle pliers to be conveniently used, with the pliers grasping the enlarged tab and wrapping the tubing around the hook shank. When the tubing has traversed the shank, the relatively reduced end 34 of the tubing is secured to the shank by thread 35. The tab 24 can then be cut off and discarded.

Figure 4:
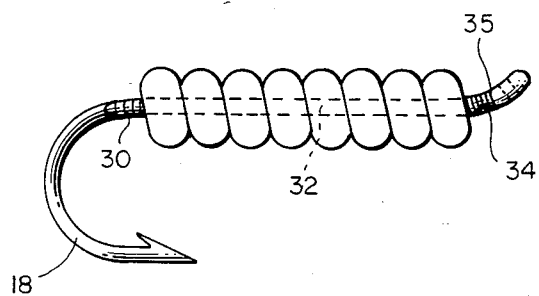

The tail 12 can be applied prior to the wrapping of the tube, or can be applied by threading after the tube has been wrapped as shown in FIG. 4. Likewise, the hackle and wings can be secured to the hook shank after the tubing has been applied.

The wrapping of the tubing around the hook shank can, if desired, provide a striated effect. For example, with light brown chenille-type material encased within the tubing, the tubing can be wrapped around the shank of the hook in such a manner that the adjacent convolutions are not in contact with each other. This arrangement provides a light brown appearance at the occurrence of the tubing convolutions, and the essentially black color of the hook between the convolutions.

Although generally cylindrical tubing is illustrated and referred to above, it will be understood that tubing of various sizes and configurations could be employed to resemble more closely other flies and insect bodies. For example, tubing having spaced relatively enlarged sections interposed between areas of relatively smaller cross section can be effectively utilized to simulate an ant body which comprises major and minor segments.

Regardless of whether the tubing is tinted, colored or dyed, a colored material inserted in the tubing, or a clear or translucent tubing wrapped around a colored thread wound around the shank of the hook, the tubing is sealed as described prior to being wrapped around the shank of the hook. The sealing provides substantial trapped air volume and consequently greater floating capability. This in turn permits the fisherman to keep the fly floating on the surface, a particularly important aspect in faster and more turbulent water flows. The high degree of floatability essentially avoids the need to apply standard fly floatant materials, and also ensures floating of the fly where imperfect casts are made.

Although a sealed plastic tubing as above described is preferred, there are limitations in small diameter ranges, as described. For example, the insertion of colored insert material in tubing having an interior diameter less than 0.11" is very difficult. In very small flies, it is therefore necessary, if the segmental appearance is to be achieved, to employ a solid plastic line or filament wrapped around the shank of the hook, as above described. If solid plastic is employed, it should have a specific gravity less than water. The color can be imparted to the plastic by the desired coloring of the plastic itself, or by threading wrapped around the shank prior to wrapping the solid plastic.

The adaptability of the invention to wet fishing was broadly referred to above, and greatly expands the use of the invention. For example, a fine metal core, such as lead, can be inserted in the plastic tubing, and can be wrapped with the tubing around the shank due to its pliability, particularly in the diameters that are relevant. The metal should have a specific gravity much greater than water to achieve the sinking effect. The desired color can be imparted by adding pigments or dyes to the lead or other metal, by coloring the tubing itself, or by wrapping the lead core with floss, for example, prior to insertion in the tubing.

Testing to date by applicant has produced very satisfactory results. In one outing, black floss was used as the coloring material, and approximately fourteen trout and approximately two-three dozen assorted shiners were landed using the fly. The fly was not damaged despite the substantial catches, and was ready for further use.

I claim:

1. An artificial fly comprising
    (a) a hook having a shank portion;
    (b) a length of hollow plastic tubing sealed at both ends and wrapped transversely around a substantial length of said shank, said tubing having a specific gravity less than water;
    (c) means to impart color to said tubing for desired color simulation, and
    (d) means for securing said tubing to said shank.

2. The artificial fly of claim 1 wherein said means to impart color to said tubing comprises color incorporated in the plastic tubing.

3. The artificial fly of claim 1 wherein said means to impart color to said tubing comprises a material of the desired color positioned in the interior cavity of said tubing formed consequent to the sealing of both ends of said tubing.

4. The artificial fly of claim 1 wherein said means to impart color to said tubing comprises layers of thread wrapped around the shank portion of said hook, and wherein said hollow plastic tubing is transparent or translucent whereby the color of said thread is transmitted through said tubing.

5. The artificial fly of claim 1 further including a tail portion secured to said shank at one end thereof, and hackle and wings secured to said shank at the other end thereof.

6. The artificial fly of claim 1 wherein said hollow tubing is formed with flattened portions at both ends thereof, and wherein said means for securing said tubing to said shaft comprises thread wrapped around said flattened ends at the end of the shank adjacent the hook ends, and thread wrapped around the opposite end of said hollow tubing after the same has been wrapped transversely around said shank.

7. The artificial fly of claim 1 wherein said hollow plastic tubing has a specific gravity of 0.91 to 0.96.

8. The artificial fly of claim 7 wherein said hollow plastic tubing comprises polyethylene.

9. The artificial fly of claim 1 wherein a metal having a specific gravity of more than water is inserted in said sealed hollow plastic tubing to provide a sinking characteristic to said fly.

10. A method of making an artificial fly comprising the steps of:
    (a) sealing the ends of a hollow plastic tubing to form a sealed interior chamber, said plastic tubing having a specific gravity less than water;
    (b) securing one end of said tubing to the shank portion of a fish hook;
    (c) wrapping said tubing transversely around said shank portion so that said tubing at any point in the length thereof is in a plane perpendicular to the axis of said shank portion of said hook;
    (d) securing the opposite end of said tubing to the opposite end of said shank portion of said hook, and
    (e) imparting the desired color to said tubing for color simulation.

11. The method of claim 10 wherein said means for imparting the desired color to said tubing comprises locating material of the desired color in the interior cavity prior to sealing the ends of said tubing.

12. The method of claim 10 wherein the color is imparted to said tubing by the further step of wrapping thread of the desired color around said shank portion prior to wrapping said tubing around said shank, and wherein said tubing is transparent or translucent to transmit therethrough the color of said thread.

13. The method of claim 10 wherein color is imparted to said tubing by incorporating the desired color into said plastic tubing.

* * * * *